UNITED STATES PATENT OFFICE.

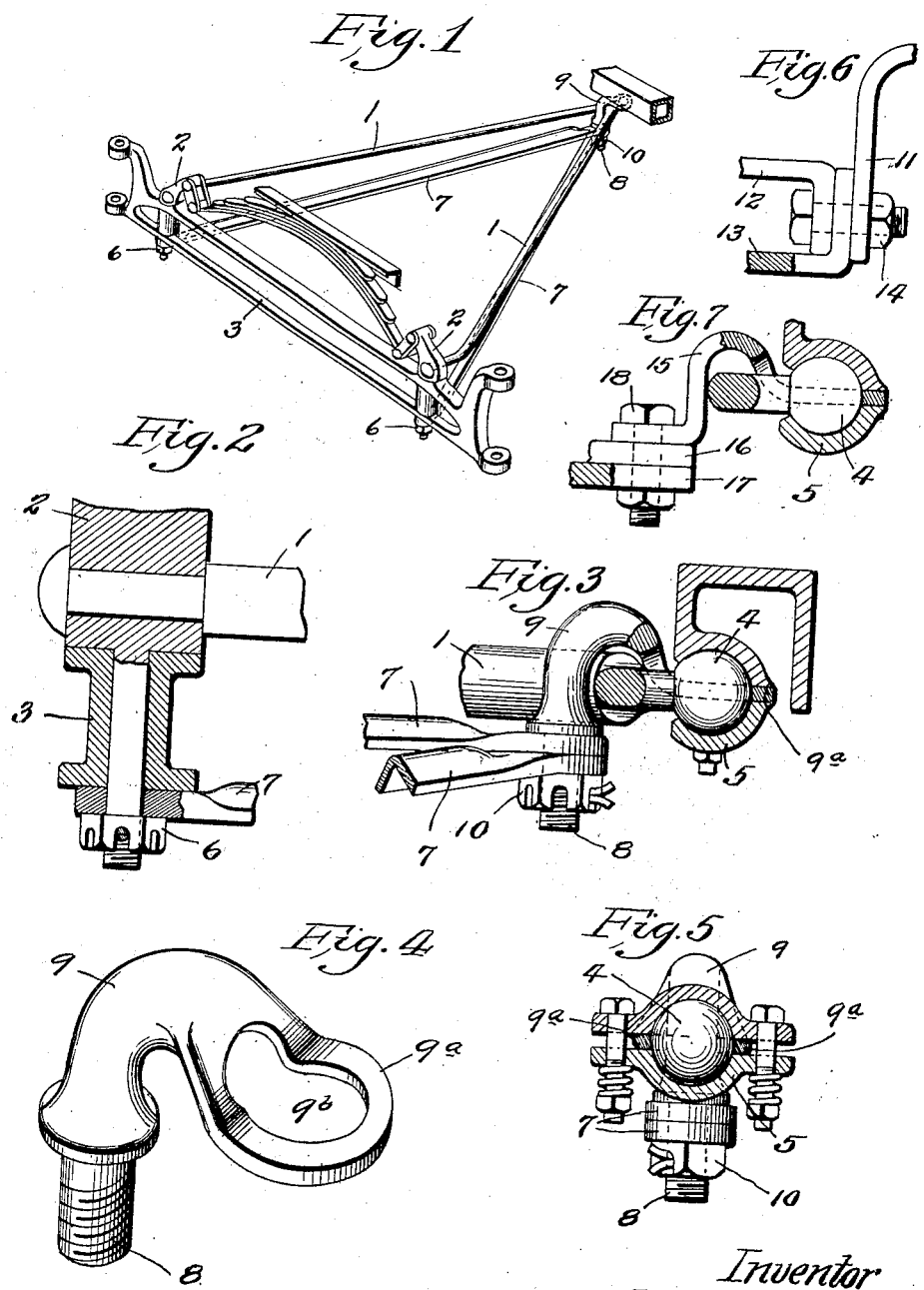

ALLEN E. BOSLEY, OF ST. LOUIS, MISSOURI.

FRONT-AXLE BRACE.

1,354,162.   Specification of Letters Patent.   Patented Sept. 28, 1920.

Application filed March 24, 1919. Serial No. 284,612.

*To all whom it may concern:*

Be it known that I, ALLEN E. BOSLEY, a citizen of the United States, residing at the city of St. Louis and State of Missouri, have invented a certain new and useful Improvement in Front-Axle Braces, of which the following is a full, clear, and exact description, such as will enable others skilled in the art to which it appertains to make and use the same, reference being had to the accompanying drawings, forming part of this specification, in which—

Figure 1 is a detail view of my improved auxiliary brace rods.

Fig. 2 is a detail view of the front axle of an automobile to which the brace rods are connected.

Fig. 3 is a vertical sectional view through the connection of the main brace rods to the machine and the auxiliary brace rods.

Fig. 4 is a detail view of the member to which the rear ends of the auxiliary brace rods are connected.

Fig. 5 is a vertical sectional view through the universal joint of the main brace rods showing the manner in which the auxiliary brace rod connecting member is secured thereto.

Fig. 6 is a detail view in vertical section of a modified form of auxiliary member, and Fig. 7 is a similar view of another modified form.

This invention relates to a new and useful improvement in axle braces for automobiles, the object being to simplify and cheapen devices of this character and also to enable the ready and easy assemblage of the supplemental or auxiliary brace rods without requiring any change in the parts of existing machines of a well known make.

In the drawings 1 indicates the main brace rods which are connected to the spring perches 2 above the front axle 3. These main brace rods converge and terminate in a ball 4 seated in a part of the engine frame and held in place by a lower cap piece or socket 5. The spring perches extend below the axles and are secured in position by a castellated nut 6, held in position by a cotter pin or wire, as is usual. 7 indicates the auxiliary brace rods which may be pressed in the form of an inverted V at their middle portions to give them strength and whose forward ends are flanged and secured to the lower portion of the front axle by means of the nut 6. These auxiliary brace rods converge at their rear ends and are connected together either by welding or are attached together by means of a threaded post 8 on an attaching member 9 by means of a nut 10 which may be held in position by a cotter pin, as is the usual practice. This member 9 is provided with a gooseneck extension terminating in a flat body portion 9ª provided with a key-hole opening 9ᵇ the circular portion of which embraces the ball 4 on the main brace member, the portion 9ª lying between the part of the engine frame and the lower socket or cap-piece 5 secured thereto, as shown in Fig. 5.

In Fig. 6 I have shown a modified form of construction in which the attaching member for the auxiliary brace rods indicated at 11 may be made of pressed metal and the auxiliary brace rods 12 and 13 formed with bent ends to be attached thereto by means of the ball 14.

In Fig. 7, I have shown a modified form in which the attaching member 15 is also made of plate metal formed with a gooseneck forward extension having a flat portion to which may be secured the rear ends of the auxiliary brace rods 16 and 17 by means of the nut 18.

What I claim is:

1. The combination with radial brace rods of an automobile which are connected at their forward ends to the front axle of the automobile and which converge and are connected together at their rear ends and terminate in a ball or universal connection to a part of said automobile, a member embracing said ball and extending between the crotch of said brace rods, and auxiliary brace rods connected to said member and to the front axle of said automobile.

2. The combination with a part of an automobile having a removable cap forming a spherical socket, of radial brace rods connected together at their rear ends and having a ball seated in said socket, the forward ends of said brace rods being connected to the front axle of the automobile, a member interposed between said socket and said automobile part and extending between the radial brace rods above mentioned, and auxiliary brace rods attached to said member and to said front axle.

In testimony whereof I hereunto affix my signature this 21st day of March, 1919.

ALLEN E. BOSLEY.